United States Patent [19]

Moore

[11] 4,270,674
[45] Jun. 2, 1981

[54] INTEGRAL HEATER FOLLOWER PLATE

[75] Inventor: Leo M. Moore, Richmond, Va.

[73] Assignee: Industrial Machine Service Co., Inc., Richmond, Va.

[21] Appl. No.: 49,571

[22] Filed: Jun. 18, 1979

Related U.S. Application Data

[63] Continuation of Ser. No. 726,790, Sep. 27, 1976, abandoned.

[51] Int. Cl.³ .......................... B67D 5/62; F16K 49/00
[52] U.S. Cl. .............................. 222/146 HE; 222/260; 219/467
[58] Field of Search ........ 222/146 R, 146 H, 146 HE, 222/260, 261, 262; 219/421, 457, 467, 542, 536

[56] References Cited

U.S. PATENT DOCUMENTS

| | | | |
|---|---|---|---|
| 1,021,230 | 3/1912 | Ball | 219/467 |
| 2,249,476 | 7/1941 | Knight | 219/467 |
| 3,113,705 | 12/1963 | Weitzel | 222/262 X |
| 3,130,876 | 4/1964 | Baker | 222/146 HE |
| 3,282,469 | 11/1966 | Skonberg | 222/146 HE |
| 3,637,111 | 1/1972 | McCreary | 222/261 X |
| 3,738,400 | 6/1973 | Weil | 222/262 X |
| 3,758,003 | 9/1973 | Kautz et al. | 222/146 HE |
| 3,811,601 | 3/1974 | Reighard et al. | 222/262 X |
| 3,982,669 | 9/1976 | Moore | 222/262 X |

FOREIGN PATENT DOCUMENTS

648006   9/1962   Canada ................... 222/146 H

*Primary Examiner*—David A. Scherbel
*Attorney, Agent, or Firm*—Witherspoon & Hargest

[57] ABSTRACT

This invention relates to integral heater follower plates designed primarily for use with hot melt dispensing apparatus. Two basic embodiments, with several variations of each of the two basic embodiments, are disclosed. The first of the two basic embodiments of the integral heater follower plate comprises a follower plate shaped to fit inside a container in which hot melt material is stored and at least one spiral heater is embedded in one surface of the follower plate. The second of the two basic embodiments of the integral heater follower plate of this invention comprises a follower plate shaped to fit inside a container in which the hot melt material is stored and a plurality of cartridge heaters housed in holes cut in the follower plate. In addition to the combination heater follower plate, optional fins that may be used with the combination heater follower plates of this invention are disclosed.

8 Claims, 18 Drawing Figures

INTEGRAL HEATER FOLLOWER PLATE

This is a continuation, of application Ser. No. 726,790 filed Sept. 27, 1976 now abandoned.

BACKGROUND OF THE INVENTION

This invention relates to follower plates used in dispensing apparatus, and more particularly, to integrally fabricated heater follower plates used in hot melt dispensing apparatus. Two embodiments of such integrally fabricated heater follower plates used with specific hot melt dispensing apparatus are disclosed in copending U.S. application Ser. No. 633,649, filed Nov. 20, 1975.

In recent years, various different materials that are now commonly called hot melt materials have been developed. These materials which are either unpumpable solids or high viscosity unpumpable liquids at or below a given temperature, becomes less viscous pumpable liquids when heated to or above a given temperature. There are many different types of hot-melt materials and these various different hot melt materials require different temperatures to convert them from a solid to a pumpable liquid or from a highly viscous unpumpable liquid to a less viscous pumpable liquid.

Several different types of dispensers have been developed for heating and dispensing hot melt materials from their containers and many of these dispensers available on the market utilize a follower plate in combination with a heater. The follower plate and the heater are generally lowered into the container that contains the hot melt material. The heater is then energized to melt the hot melt material. As the hot melt material is melted, it is removed from its container generally by means of a pump that pumps the hot melt material out of the container usually through an opening provided in the follower plate. As the material is dispensed from its container, the heater and the follower plate move down into the container thereby continuously melting the material so that it can be pumped out of its container.

To Applicant's knowledge, except for the integrally fabricated heater follower plates disclosed in his aforesaid copending application, the prior art heater and follower plates are two separate structural elements or plates. For example, the apparatus disclosed in U.S. Pat. No. 3,282,469 to Shonberg includes a follower plate and a separate heated plate that is located below the follower plate and the apparatus disclosed in U.S. Pat. No. 3,412,903 includes a follower plate and a separate heater plate located below and spaced apart from the follower plate. In the apparatus disclosed in both of the aforementioned U.S. patents, the heater plate is located below the follower plate. In the aforesaid U.S. Pat. No. 3,282,469, the heater plate is secured to the bottom of the follower plate, while in the aforesaid U.S. Pat. No. 3,412,903 the heater plate is suspended from the bottom of the follower plate. Thus, in both of these U.S. patents, the heater and follower plate are separate elements. In use the heater plate and the follower plate of the two aforementioned U.S. patents and in most, if not all, prior art hot melt dispensers using follower and heater plates, the follower plate and heater plate are lowered into the container, usually a drum, that contains the hot melt material. Therefore, if the heater malfunctions or burns out while in use, the entire assembly must be removed from the container in order to repair or replace the heater. Of course, while the heater plate and follower plate are removed to repair or replace the heater plate the dispensing apparatus has to be taken off-line. This can be a time consuming and thus costly process.

The heater follower plates of this invention are fabricated as an integral unit. That is, there is no separate heater plate utilized in the integral-heater follower plates of this invention; instead, the heater of the integral heater follower plates of this invention is integrated into the follower plate. In the first of two basic embodiments of this invention the heater comprises at least one spiral heating element that is embedded into one surface of the follower plate and in the second of the two basic embodiments of this invention the heater is made up of a plurality of individual cartridge heaters located in holes cut into the follower plate. In the first of the two basic embodiments of this invention, the follower plate must be removed from the container to repair the heater, which as mentioned is the case with the prior art heater plate and follower plate combinations; however, in the second of the two basic embodiments of this invention, the cartridge heaters can be individually removed and replaced without removing the follower plate from the container. Thus, this invention not only provides an integral heater follower plate but also provides in one of the two basic embodiments disclosed an integral heater follower plate in which the heater can be repaired without removing the apparatus from the container which contains the hot melt material.

SUMMARY OF THE INVENTION

This invention relates to integrally fabricated heater follower plates. Two basic embodiments, with variations of the two basic embodiments, are disclosed.

The first basic embodiment comprises a follower plate shaped to fit inside a container that contains hot melt material. One or more spiral grooves are cut into one surface of the follower plate and a wire heater element is then pressed into each spiral groove to form a spiral heater. In one variation of the first embodiment, a pair of resilient wipers encircle the follower plate. In a second variation of the first embodiment, the resilient wipers are not provided.

The second of the two basic embodiments also comprises a follower plate shaped to fit into a container that contains hot melt material. The follower plate has a plurality of holes cut into one surface and a cartridge type heater is dropped into each of the holes cut into the follower plate. Two variations of the follower plate of this second embodiment along with three variations of the cartridge heater arrangement are disclosed. In the first variation of the follower plate of this second embodiment, the follower plate is provided with a pair of resilient wipers that surround the follower plate and in the second variation the wipers are not provided. The three variations of the cartridge heater arrangement disclosed are variatios of the depth of penetration of the cartridge heaters into the follower plate and therefore the depth of the holes cut into the follower plates. In one of the cartridge heater variations, the holes in the follower plate are cut into one surface of the follower plate toward the opposite surface but not through the opposite surface. A cartridge heater is dropped into each hole. In a second variation, the holes are cut all the way through the follower plate. A cartridge heater is then secured in each one of the holes such that one end of each cartridge heater is flush with or substantially flush with one surface of the follower plate while the opposite end of each cartridge is either flush with the opposite surface of the follower plate or extends above or below the opposite surface of the follower plate depending upon the length of the cartridge heater. In the third variation of the cartridge heater arrangement, the holes cut in one surface of the follower plate are very shallow and the cartridge heaters used are relatively flat as compared to the cartridge heaters used in the other two cartridge heater variations.

In addition to the two basic embodiments of the invention, fins that may be used with any of the disclosed integral heater follower plates of this invention are disclosed. When used, the fins are secured to the heater follower plate, preferably in a definite pattern.

BRIEF DESCRIPTION OF THE DRAWING

A complete understanding of the structural details of all the embodiments of the invention can be obtained from the following detailed description of the invention when read in conjunction with the annexed drawing in which.

DETAILED DESCRIPTION OF THE INVENTION

Figure 1:
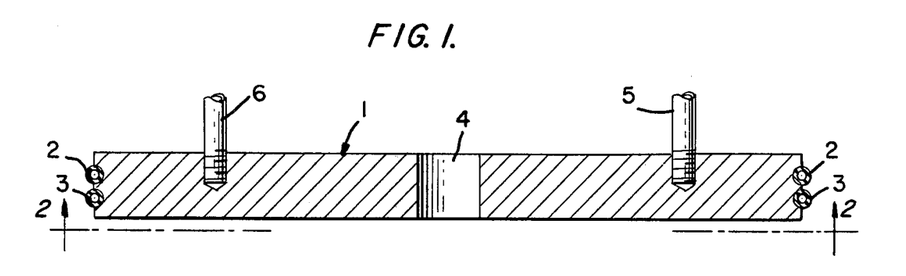
FIG. 1 is a cross-view of a follower plate constructed in accordance with this invention.
Figure 2:
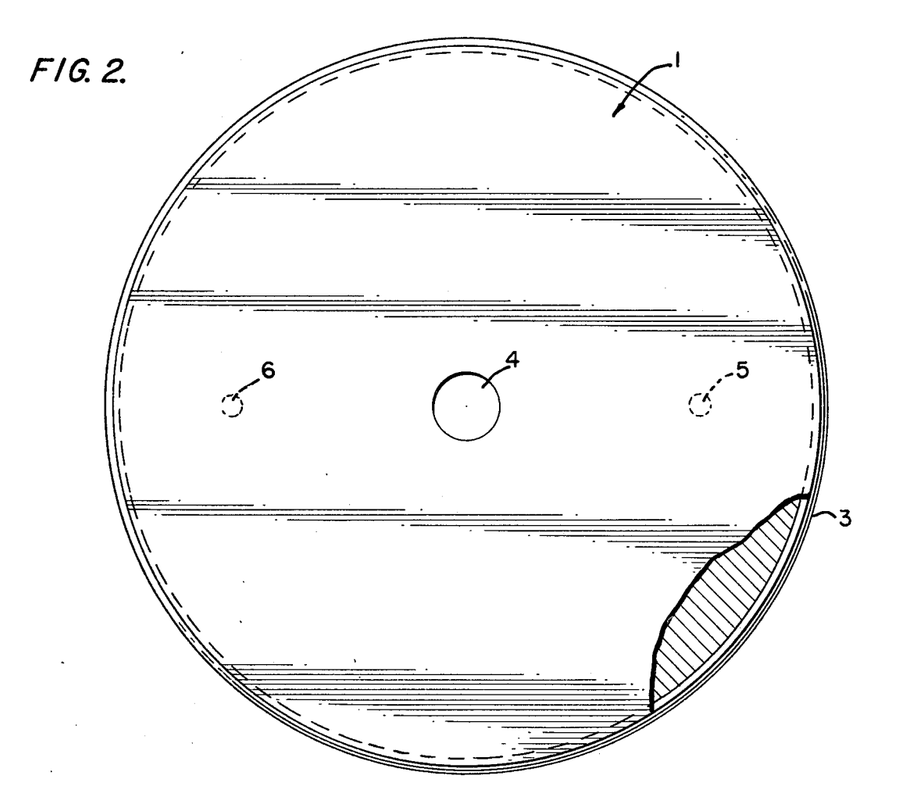
FIG. 2 is a bottom view of the follower plate of FIG. 1.

Referring to the drawing and particularly to FIGS. 1 and 2, FIGS. 1 and 2 show a cylindrical follower plate 1 having a hole 4 cut through its center. Follower plate 1 is made from any suitable heat conducting material such as aluminum. A pair of wipers 2 and 3 encircle follower plate 1. These wipers 2 and 3 are made from a resilient material that can withstand high temperatures. Grooves are cut into the periphery of follow plate 1 and wipers 2 and 3 are each secured in a different one of the two grooves such that wipers 2 and 3 extend beyond the edge of follower plate 1. A pair of rods 4 and 5, shown broken in FIG. 1, are secured to the top surface of follower plate 1. Rods 4 and 5 are preferably secured by drilling holes in the top of follower plate 1 and then securing rods 4 and 5 in the holes. Rods 4 and 5 are preferably secured in these holes by providing threads on the inside of the holes with mating threads being provided along this end of each of the rods 4 and 5. Of course, rods 4 and 5 can be secured to follower plate 1 by any suitable means such as by welding. As shown in FIG. 2 the bottom surface of follower plate 1 is substantially a flat smooth surface.

Follower plates such as follower plate 1 have been and are being used in dispensers that dispense pumpable liquid material from drums containing the liquids. Generally, the ends of rods 4 and 5, not shown in the drawing, are secured to a mechanism for raising and lowering follower plate 1 into and out of the drum containing the liquid that is to be dispensed. Generally, a pump communicates with the liquid in the drum through hole 4 to pump the liquid out of the drum. As the liquid is pumped out of the drum, the mechanism to which the ends of rods 4 and 5, not shown, are secured, lowers follower plate 1 down into the drum. As follower plate 1 drops down into the drum, wipers 2 and 3 wipe the liquid from the side of the drum.

Follower plate 1 is shown as being cylindrical shaped because such follower plates are often used with dispensing apparatus that dispense large quantities of liquid material and such large quantities of liquid material are usually stored in large cylindrical drums. However, follower plates such as follower plate 1 can be used with any shape or size of container since all that needs to be done is to impart the proper shape and size to the follower plate 1 so that it will fit into the container from which the material is to be dispensed. Thus, if the containers storing the material are square or rectangular, follower plate 1 would be made square or rectangular, respectively. Also, hole 4 need not be cut in the dead center of follower plate 1. Hole 4 can be offset from center since the hole is merely provided to permit a pump or other dispensing apparatus to communicate with the material in the container into which follower plate 1 has been lowered. Thus, although follower plate 1 is shown as being cylindrical, it is to be remembered that follower plate 1 can have any shape and size and will have a shape other than cylindrical if the container with which it is to be used is not circular. The important fact is that follower plate 1 is designed to fit the container with which it is to be used and is shown as being cylindrical shaped only because such follower plates are most commonly used with dispensers that dispense materials from conventional drums.

As will become apparent, all of the follower plates and all of the integrally fabricated heater follower plates of this invention shown in the various figures of the drawing are shown as being cylindrically shaped with the hole equivalent to hole 4 of follower plate 1 being in the middle of the follower plate. In all cases the follower plate shown and the integral heater follower plates of this invention shown in the drawing can be fabricated to have any shape other than the cylindrical shape shown and the hole equivalent to hole 4 in follower plate 1 does not have to be in the center. Thus, the important facts to be remembers is that the integral heater follower plates of this invention can be fabricated to have any shape and size and that the integral heater follower plates are in fact fabricated to fit inside the hot melt material container with which a given integral heater follower plate of this invention will be used and that, therefore, the shape of a given integral heater follower plate of this invention is dictated by the shape of the hot melt material container with which it is to be used. Therefore, the various integral heater follower plates of this invention are all shown in the drawing as being cylindrical only because hot melt material containers, particularly the larger containers, are generally conventional cylindrical shaped drums and for ease of description of the invention.

Figure 5:
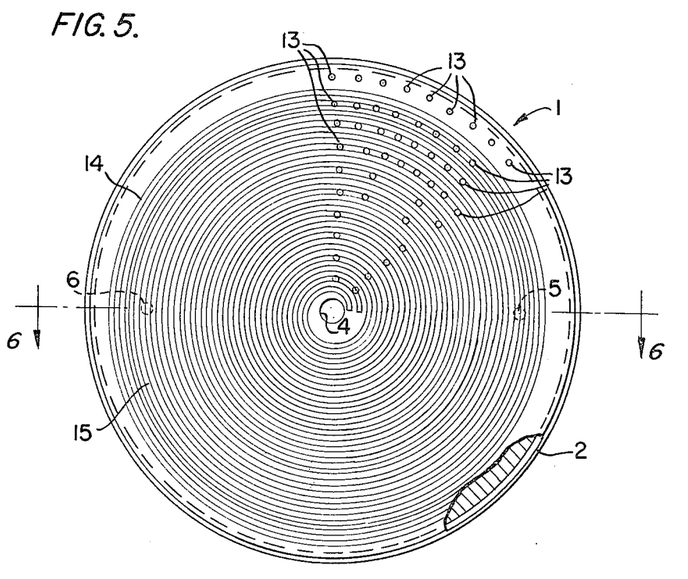
FIG. 5 is a bottom view of a first basic embodiment of the integral heater follower plate of this invention utilizing the follower plate of FIGS. 1 and 2.
Figure 6:
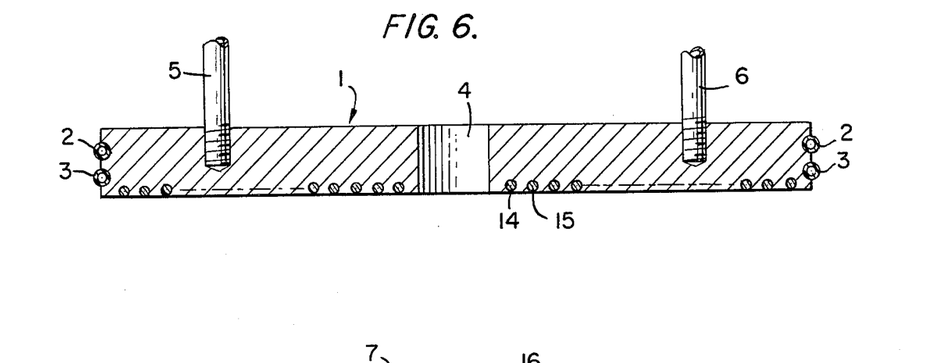
FIG. 6 is a cross-section of the integral heater follower plate of FIG. 5.

Referring now to FIGS. 5 and 6, these figures show the first basic embodiment of the integrally fabricated heater follower plates of this invention. In this first basic embodiment of the invention, follower plate 1 of FIGS. 1 and 2 is utilized to construct the integral heater follower plate of FIGS. 5 and 6. A pair of spiral grooves are cut into the bottom surface of follower plate 1. The heater wire 14 is pressed into one of these grooves and the heater wire 15 is pressed into the other groove. Heater wires 14 and 15 thus form a spiral heater which is embedded into follower plate 1 to form an integral heater follower plate. Heater wires can be wedged into the grooves so that they will be frictionally held in place but are, however, preferably secured in place by any suitable means such as strapping because of the expansion and contraction experienced by heater wires 14 and 15 and follower plate 1. If straps are used, these straps would merely consist of narrow strips of suitable material that pass over the wires along selected points and are secured to the bottom surface of follower plate 1 by any suitable means such as bolts or screws.

The integral heater follower plate shown in FIGS. 5 and 6 is also disclosed in my aforementioned copending U.S. application Ser. No. 633,649, filed Nov. 20, 1975. In FIGS. 5 and 6 two heater wires, wires 14 and 15, are shown. Only one such heater wire could be provided or more than two could be provided. The number of spiral grooves provided in follower plate 1 would, of course, have to be equal to or greater than the number of heater wires provided.

Figure 3:
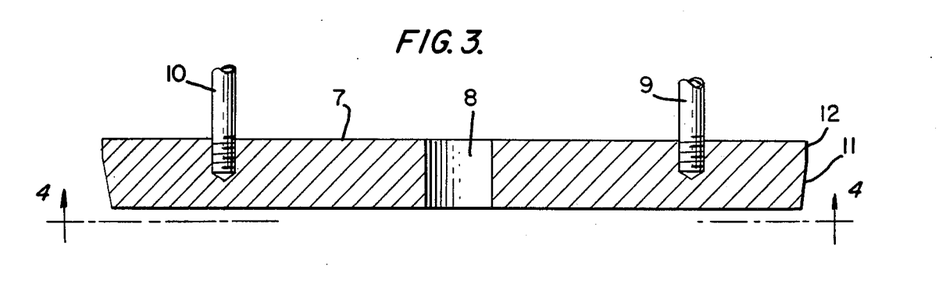
FIG. 3 is a cross-section of a variation of the follower plate of FIGS. 1 and 2.
Figure 4:
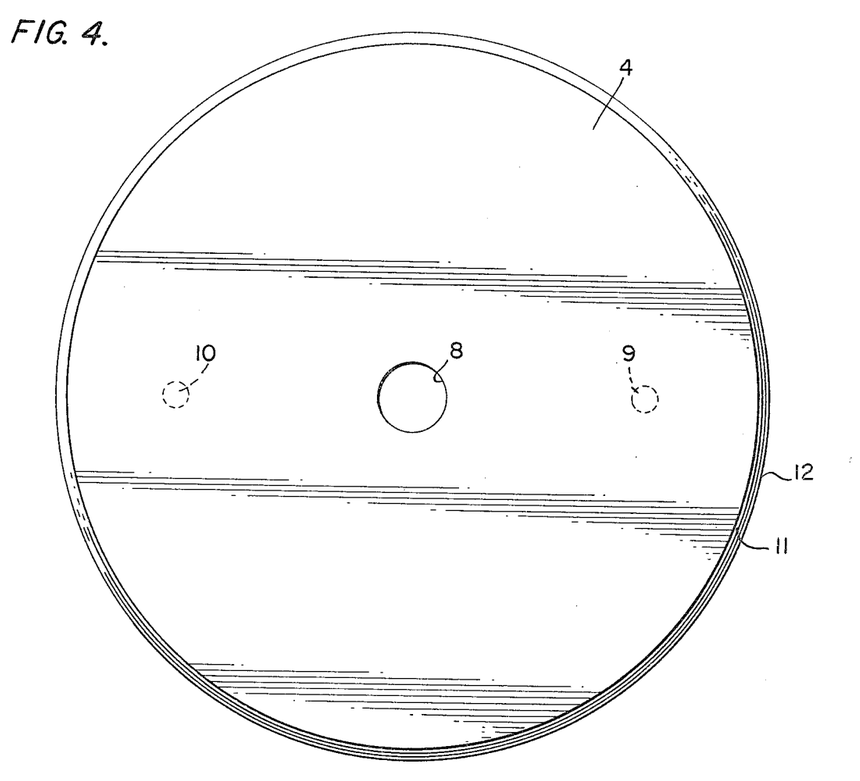
FIG. 4 is a bottom view of the follower plate of FIG. 3.

Referring now to FIGS. 3 and 4, these figures show a follower plate 7 that is a variation of follower plate 1 of FIGS. 1 and 2. Thus follower plate 7 has a hole 8 equivalent to hole 4 of follower plate 1 and rods 9 and 10 equivalent to rods 5 and 6 of follower plate 1. However, follower plate 7 does not have wipers equivalent to wipers 2 and 3 of follower plate 1. Instead, the periphery of follower plate 7 slants inward going from the top to the bottom. This is in the area of follower plate 7 labelled 12, the diameter is the same as at the top of follower plate 7 and gradually tapers inward in the area labelled 11. When follower plate 7 is inserted into a drum or other container, the area 12 serves to wipe the sides of the drum as follower plate 7 moves into the drum while the area 11 does not touch the drum. In this manner, the amount of surface that touches the edges of follower plate 7 is kept to a minimum while at the same time wiping action is provided. The wipers 2 and 3 also provide a seal to prevent the hot melt from leaking around the edges of follower plate 1. Similarly, the area 12 provides a sealing action since follower plate 7 is sized to fit snugly into the container with which it is designed to be used. In practice, the resilient wipers 2 and 3 of follower plate 1 provide a better seal and provide better wiping action, particularly where irregularities occur in the surface of the container. However, some hot melt materials require high temperatures that are detrimental to resilient wipers, such as wipers 2 and 3. At these high temperatures, the wipers have to be replaced continuously or cannot from a practical standpont be used at all. In such cases, follower plate 7 instead of follower plate 1 would be used. Note that the edge of follower plate 7 can take other shapes than that shown in FIGS. 3 and 4. For example, the edge could be made concave so that top and bottom knife edges are formed to provide wiping and sealing or just a top knife edge could be provided. In any event, the important fact is that some sort of wiping edge and sealing edge be provided when resilient wipers are not practical or suitable.

Figure 7:
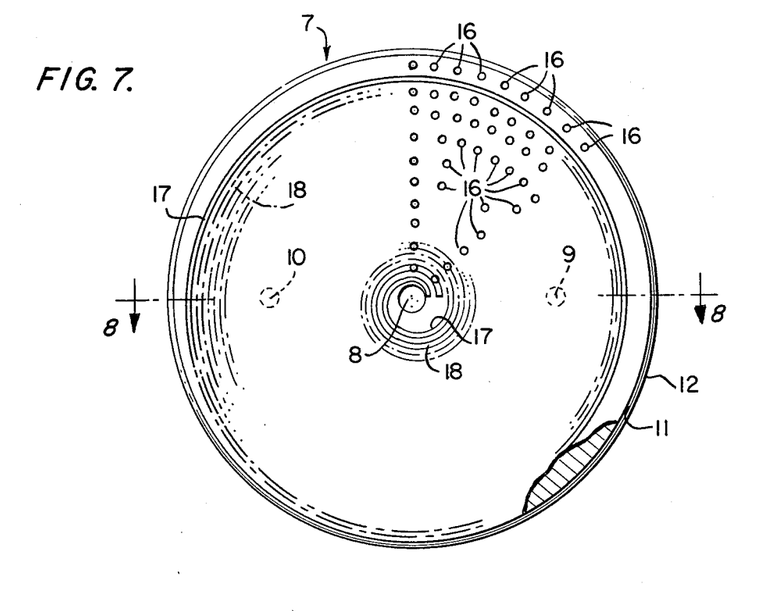
FIG. 7 is a bottom view of a variation of the first basic embodiment of the integral heater follower plate of this invention utilizing the follower plate of FIGS. 3 and 4.
Figure 8:
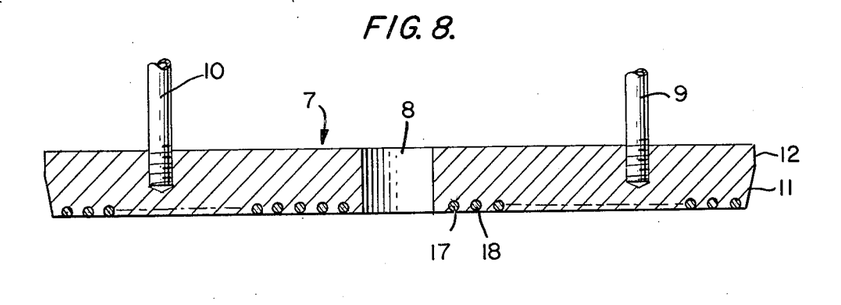
FIG. 8 is a cross-section of the integral heater follower plate of FIG. 7.

Referring now to FIGS. 7 and 8, these figures show an integral heater follower plate constructed in accordance with the first basic embodiment of this invention using follower plate 7 instead of follower plate 1. The integral heater follower plate of FIGS. 7 and 8 is equivalent to the integral heater follower plate of FIGS. 5 and 6. Thus, a pair of grooves are cut into the bottom surface of follower plate 7 and the heater wires 17 and 18 are each wedged into a different one of these grooves. Only a part of the wires 17 and 18 are shown since these wires are identical to wires 14 and 15 of FIGS. 5 and 6. That is, wires 17 and 18 form a spiral heater of the same configuration as the spiral heater formed by wires 14 and 15 of FIGS. 5 and 6. As is the case with the integral heater follower plate of FIGS. 5 and 6, only one wire need be used to form the spiral heater of the integral heater follower plate of FIGS. 7 and 8 or more than two wires can be used.

Referring again back to FIG. 5, a plurality of small holes 13 are shown as being cut into the bottom surface of this integral heater follower plate. Similarly, in FIG. 7, a plurality of small holes 16 are shown in the bottom of this integral heater follower plate. As will become apparent later on in the discussion of FIGS. 17 and 18, holes 13 and 16 are used to secure the fins of FIGS. 17 and 18 to the integral heater follower plates of FIGS. 5 and 6 and FIGS. 7 and 8, respectively. Also as will become apparent, only a part of the total number of holes 13 and 16 are shown in FIGS. 5 and 7, respectively.

Figure 9:
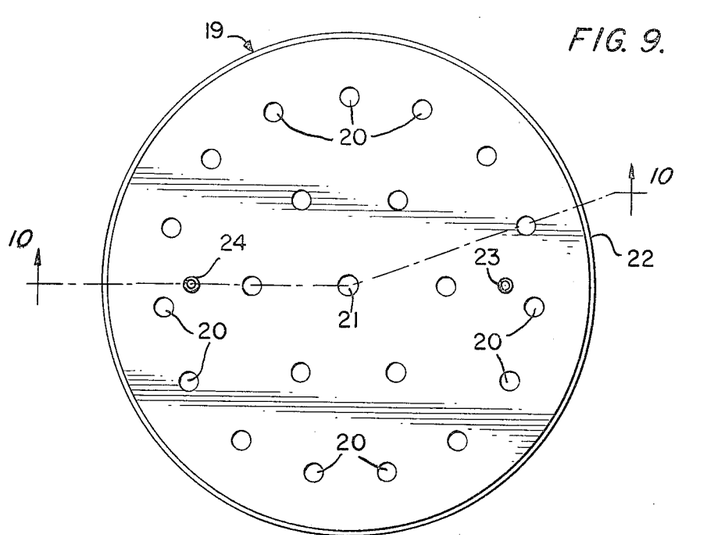
FIG. 9 is a top view of a follower plate constructed in accordance with the second basic embodiment of the invention.

Referring to FIG. 9, this figure shows a follower plate 19 that is equivalent to follower plate 1 of FIGS. 1 and 2. Thus, follower plate 19 has a hole 21 equivalent to hole 4 of follower plate 1, a pair of rods 23 and 24 equivalent to rods 5 and 6 of follower plate 1, and a pair of resilient wipers 22 and 26 equivalent to wipers 2 and 3 of follower plate 1. Note hole 21 is shown as being smaller than hole 4 of follower plate 1. This is to illustrate that the size of holes which are used to withdraw material from the container in which either one of follower plates is used is not critical. Hole 4 of follower plate 1 and hole 21 of follower plate 19 need only be of sufficient size to permit sufficient material to flow through these holes to meet the demand of the pump or the like that is withdrawing material up through these holes. While follower plate 19 is essentially equivalent to follower plate 1, unlike follower plate 1, follower plate 19 has a plurality of holes 20 cut into its upper surface. Holes 20 are utilized to construct the second basic embodiment of the integral heater follower plate of this invention.

Figure 10:
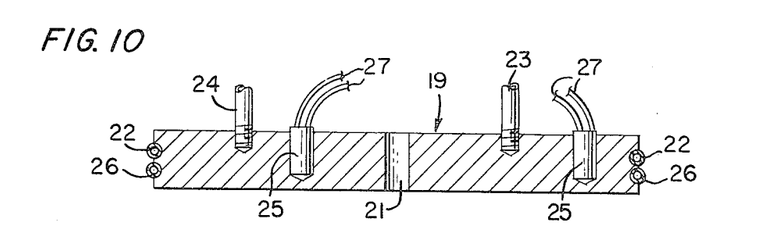
FIG. 10 is a cross-section view of the second basic embodiment of the integral heater follower plate of this invention utilizing follower plate of FIG. 9.
Figure 11:
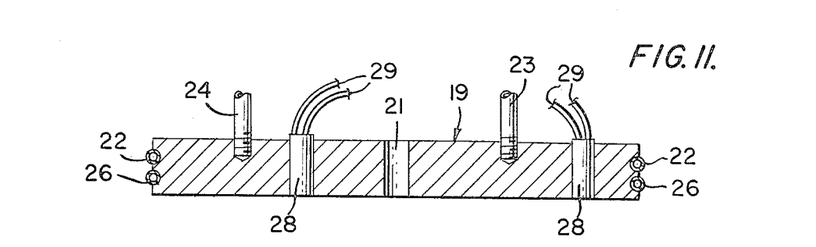
FIG. 11 is a cross-section of a first variation of the integral heater follower plate of FIG. 10.
Figure 12:
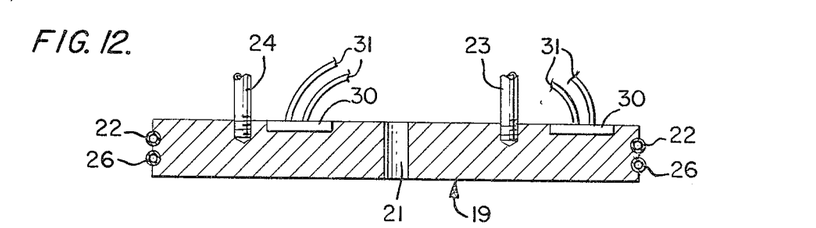
FIG. 12 is a cross-section of a second variation of the integral heater follower plate of FIG. 10.

FIGS. 10, 11 and 12 show three different variations of the second basic embodiment of this invention utilizing follower plate 19. In FIG. 10, holes 20 are cut into the bottom surface of follower plate 19 toward the bottom surface but stop just short of penetrating the bottom surface. A separate cartridge heater 25 is dropped into each of the holes 20. Cartridge heaters 25 are energized electrically and are, therefore, each provided with a pair of electrical wires 27. These wires are connected to a source of electrical power not shown. Of course, the spiral heaters of FIGS. 5 and 6 and FIGS. 7 and 8 are also connected to a source of electrical power not shown. If the integral heater follower plate of FIG. 10 is utilized in the upright position shown in FIG. 10, heaters 25 need merely be dropped into holes 20 without the need to secure heaters 25 into holes 20. If on the other hand, the integral heater follower plate 19 is used in an inverted position, heaters 25 will have to be secured into holes 20 by any suitable means such as straps that fit across each of the cartridge heaters 25 and are secured to follower plate 19 or cartridge heaters 25 and holes 20 could be threaded so that cartridge heaters 25 could be threaded into holes 20. The integral heater follower plate of FIG. 10 is also disclosed in my said copending U.S. application Ser. No. 633,649.

FIG. 11 shows a variation of FIG. 10. In the variation, holes 20 are cut all the way through follower plate 19 and a separate cartridge heater 28 is secured into each hole 20. In this variation, cartridge heaters 28 must be secured into holes 20 whether or not this integral heater follower plate is used in the upright position shown or inverted; since without some means of securing cartridge heaters 28 in holes 20, cartridge heaters 28 would either fall through follower plate 19 or would be pushed out of holes 20 by the hot melt material when in use. Again, either a suitable strap arrangement could be used or holes 20 and cartridge heaters 28 could be threaded. Each cartridge heater 28 is provided with a pair of electrical wires 29 equivalent to wires 27 of cartridge heaters 28. Cartridge heaters 28 are shown as being longer than cartridge heaters 25 of FIG. 10. Cartridge heater 25 of FIG. 10 could also be used in FIG. 11. The length of the cartridge heater is merely a matter of choice; however, it is probably preferable to have holes 20 be completely filled with a cartridge heater no matter what the depth of holes so the entire inside surface of holes 20 is in contact with a heated element.

FIG. 12 shows a second variation of the integral heater follower plate of FIG. 10 using follower plate 19. In this variation, holes 20 are merely very shallow indentations and a separate relatively flat cartridge heater 30 is seated into each of these shallow indentations. Cartridge heaters 30 need not be secured in holes 20 when the integral heater follower plate is used in the upright position shown provided holes 20 are of a sufficient depth to hold them in place. If holes 20 are not sufficiently deep to hold heaters 30 in place or if this integral heater follower plate is used in an inverted position, heaters 30 will be secured in place by any suitable known means. Each of the cartridge heaters 30 is provided with a pair of electrical wires 31 so that cartridge heaters 30 can be connected to a source of electricity not shown.

While the first basic embodiment of the invention, the spiral heater embodiment, shown in FIGS. 5 and 6 and the variation thereof shown in FIGS. 7 and 8 and the second basic embodiment, the cartridge heater embodiment, shown in FIG. 10 and the variations thereof shown in FIGS. 11 and 12, both provide suitable integral heater follower plates that avoid the necessity of separate heater plates and separate follower plates, the second basic embodiment, the cartridge heater embodiment, provides certain advantages over the first basic embodiment, the spiral heater embodiment. If the heater in the spiral heater embodiment malfunctions or becomes burnt out while in use, it must be removed from the container in which it is being used and then repaired or replaced. In the cartridge heater embodiment, any one of the cartridge heaters or all of them can be replaced without removing the apparatus from the container in which it is being used if the need arises. Of course, rarely will all of the cartridge heaters have to be replaced at one time since it is highly unlikely that all of them would burn out at the same time. Further, location of a burned out cartridge heater and replacement can be facilitated by providing each cartridge heater with, for example, visual indication (a small light bulb) so that a burned out cartridge heater could be located immediately and the wires with each cartridge heater could be provided with a connector with the power source being provided with mating connectors to facilitate the disconnecting of the faulty cartridge heater and the connecting of a new cartridge heater to the power source. Thus, all one would need to do is upon the noticing of a faulty cartridge heater would be to disconnect the faulty heater, pull it out of its hole 20 or unsecure it from its hole 20, as the case may be, drop or secure a new cartridge heater in place and connect the new heater to the power source. In the case of the spiral heater embodiment, a burned out wire would have to be disconnected from the power source and taken out of its groove and then a new wire would have to be wedged or secured into the groove and then connected to the power source with the integral heater follower plate removed from the container. Further, the replacing of a spiral heater wire is difficult and would probably have to be accomplished at a work site away from the apparatus with which the heater follower plate is being used. A cartridge heater can be replaced on site and if the integral heater follower plate is at such a depth in the container that removal of a cartridge heater would be difficult without extracting the integral heater follower plate, the replacement of one or more cartridge heaters can wait until that container is empty and the integral heater follower plate is withdrawn from the spent container, since the cartridge heater embodiment of the integral heater follower plate of this invention will function satisfactorily with a few burned out cartridge heaters, provided that not so many are burned out that insufficient heat is provided.

The actual number of cartridge heaters provided in the arrangement of the cartridge heaters in either of the three variations of FIGS. 10, 11 and 12 is a matter of choice and is not critical. However, a sufficient number of cartridge heaters is required to provide the degree of heat needed and this number should be fairly uniformly spaced throughout the follower plate. In FIG. 9, twenty-one holes 20 are shown as being substantially uniformly spaced throughout follower plate 19; thus, twenty-one cartridge heaters 25, 28, or 30 would be provided. Twenty-one cartridge heaters have been found to provide a sufficient degree of heat. Further, since three-phase power is used to energize the cartridge heaters, twenty-one heaters provide a means of balancing the load on each phase of the three-phase power, since twenty-one is a multiple of three. Thus, seven different ones of the cartridge heaters are connected to each phase of the three-phase power to provide a balanced load on each phase. Thus, while the number of cartridge heaters is not critical, the number should be a multiple of three if three-phase power is used in the manner described above. A multiple of three greater than 21 or less than 21 can be used so long as the number of cartridge heaters is sufficient to provide the degree of heat required.

The advantages of the cartridge heater embodiment of this invention as compared to the spiral heater embodiment were described above. The cartridge heater variation of FIG. 10 also has some slight advantages over the cartridge heater variations of FIGS. 11 and 12. In the FIG. 11 variation, the hot melt material is in direct contact with the cartridge heaters when this variation is in use. The hot melt material will adhere to the cartridge heaters 28 and this may make it difficult to remove cartridge heaters 28. Further, with cartridge heaters 28 secured in place, hot melt material may seep up between the inside of holes 20 and the outside of cartridge heaters 28. If hot melt material does seep around a cartridge heater 28 and this cartridge heater burns out, it may be exceedingly difficult to remove this cartridge heater from its hole 20. The variation of FIG. 12 does not suffer from these potential problems of the variation of FIG. 11; however, with the relatively flat cartridge heaters 30, the heat must flow downward through follower plate 19 whereas in the variations of FIGS. 10 and 11, cartridge heaters 25 and 28 are deeply embedded into follower plate 19 and the heat flows through follower plate 19 in all directions, except upward, of course; thereby providing for more rapid and potentially more uniform heating of follower plate 19. However, flat cartridge heaters, such as cartridge heaters 30, can provide an advantage over the variations of FIGS. 10 and 11. With the flat cartridge heaters 30, holes 20 can be eliminated. If no holes, even the shallow holes of FIG. 12, are provided, cartridge heaters 30 would merely be secured to the top surface of follower plate 19. This would eliminate the cost of cutting holes 20 into follower plate 19.

Figure 13:
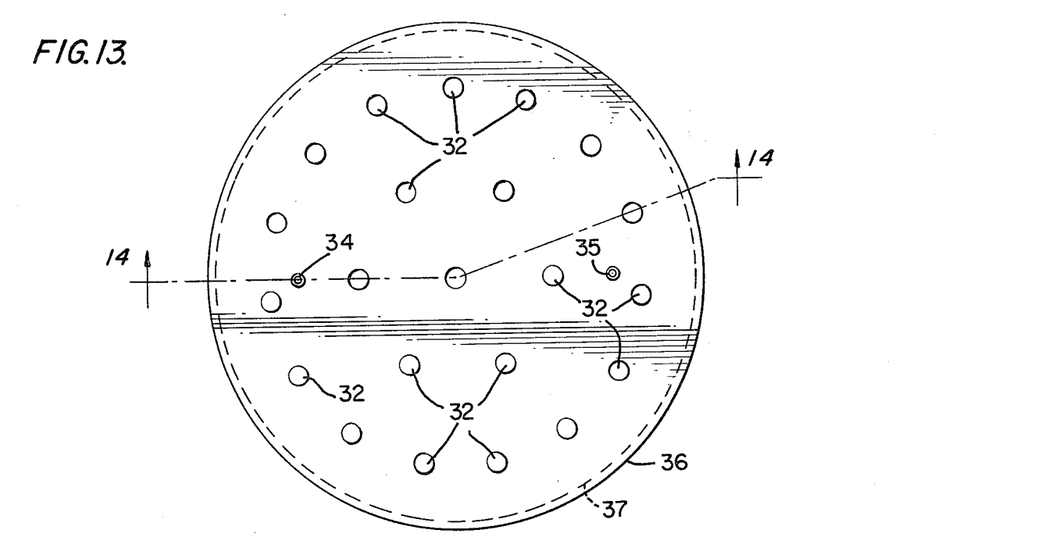
FIG. 13 is a top view of a variation of the follower plate of FIG. 9.

Referring now to FIG. 13, the figure shows a follower plate 31 which is essentially equivalent to follower plate 7 of FIGS. 3 and 4. Thus, follower plate 31 has a hole 33 equivalent to hole 8 of follower plate 7, a pair of rods 34 and 35 equivalent to rods 9 and 10 of follower plate 7, and a wiper surface 36 and a tapered surface 37 equivalent to surfaces 12 and 11, respectively, of follower plate 7. However, unlike follower plate 7, follower plate 31 has a plurality of holes 32 cut into its top surface. Holes 32 of follower plate 31 are equivalent to holes 20 of follower plate 19.

Figure 14:
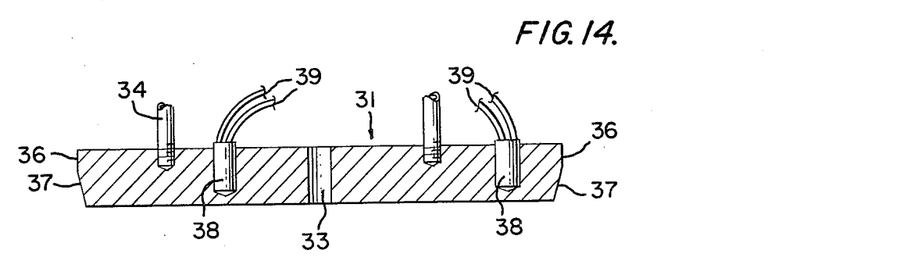
FIG. 14 is a cross-section of the second basic embodiment of the integral heater follower plate of this invention utilizing the follower plate of FIG. 13.
Figure 15:
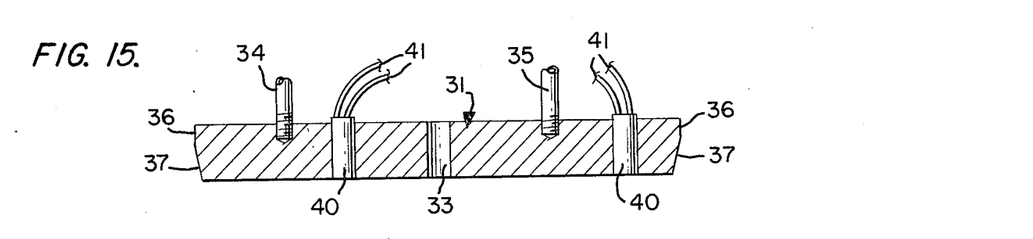
FIG. 15 is a cross-section of a first variation of the integral heater follower plate of FIG. 14.
Figure 16:
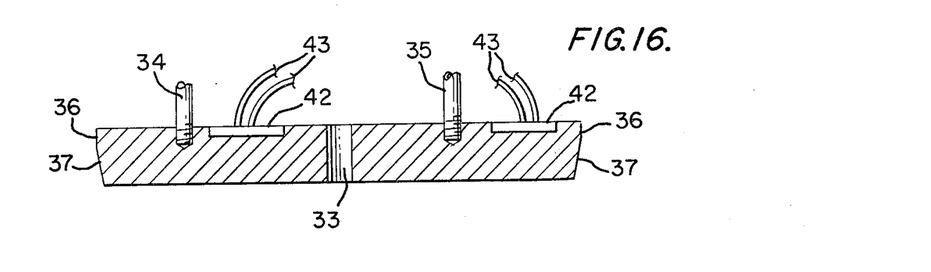
FIG. 16 is a cross-section of a second variation of the integral heater follower plate of FIG. 14.

FIGS. 14, 15 and 16 show three variations of the cartridge heater embodiment of this invention using follower plate 31. The three variations shown in FIGS. 14, 15 and 16 are identical to the variations shown in FIGS. 10, 11 and 12, respectively, except that the integral heater follower plates of FIGS. 14, 15 and 16 use follower plate 31, whereas the integral heater follower plates of FIGS. 10, 11 and 12 use follower plate 19. Thus, in FIG. 14, the holes 32 are cut into the top surface of follower plate 31 toward the bottom surface of follower plate 31 and a separate cartridge heater 38 having a pair of wires 39 is dropped into each of the holes 32. Cartridge heaters 38 are equivalent to cartridge heaters 25 of FIG. 10; therefore, the comments made with respect to FIG. 10 also apply to the integral heater follower plate of FIG. 14. Wires 39 are, of course, used to connect cartridge heaters 38 to an electrical power source.

In the variation of FIG. 15, holes 32 are cut all the way through follower plate 31 and a separate different cartridge heater 40 having a pair of wires 41 is secured in each of the holes 32. This variation of FIG. 15 using follower plate 31 is equivalent to the variation shown in FIG. 11 using follower plate 19; therefore, the comments made with respect to FIG. 11 also apply to the integral heater follower plate of FIG. 15.

In the variation of FIG. 16, holes 32 are very shallow holes and separate relatively flat cartridge heaters 42 having a pair of wires 43 are dropped into or secured in each of the holes 32. The variation shown in FIG. 16 using follower plate 31 is equivalent to the variation shown in FIG. 12; therefore, all the comments made with respect to FIG. 12 also apply to the integral heater follower plate of FIG. 16.

From the foregoing discussion of FIGS. 14, 15 and 16, it is obvious that the integral heater follower plates of FIGS. 14, 15 and 16 are fully equivalent to the integral heater follower plates of FIGS. 10, 11 and 12, respectively, except that the integral heater follower plates of FIGS. 14, 15 and 16 use follower plate 31 of FIG. 13, whereas the integral heater follower plates of FIGS. 10, 11 and 12 use follower plate 19 of FIG. 9. Therefore, the comments made above with respect to the integral heater follower plates of FIGS. 10, 11 and 12 relative to the basic spiral heater embodiment of the invention and the comments made with respect to relative differences and advantages of the integral heater follower plates of FIGS. 10, 11 and 12 relative to each other apply equally to the integral heater follower plates of FIGS. 14, 15 and 16. Further, the comments made with respect to the number and arrangement of the cartridge heaters of FIGS. 10, 11 and 12 apply equally to the arrangement and number of cartridge heaters in FIGS. 14, 15 and 16.

Figure 17:
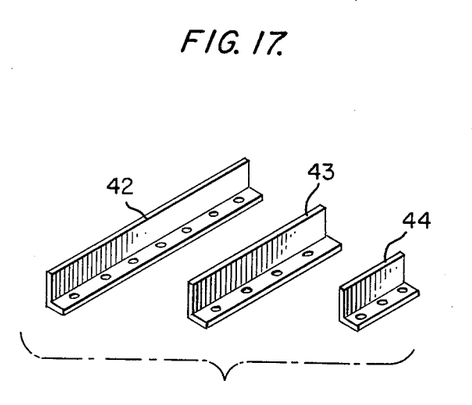
FIG. 17 shows optional fins that may be used with the integral heater follower plates of this invention.
Figure 18:
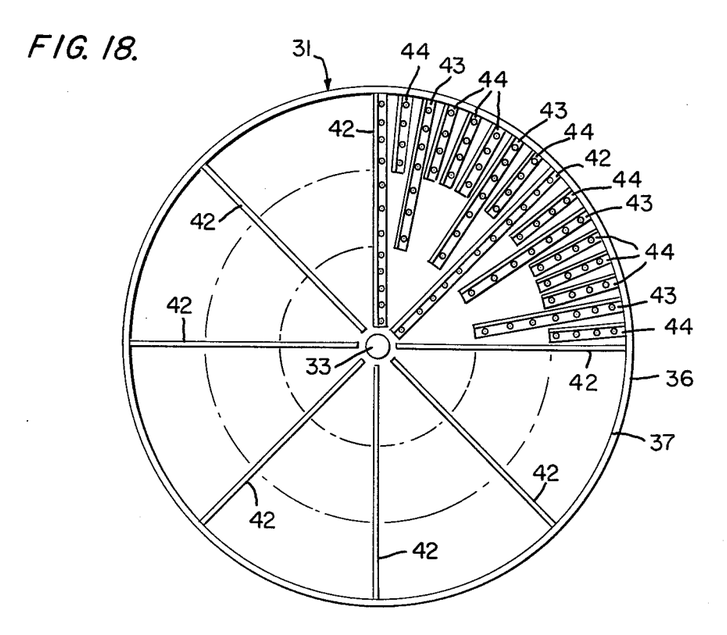
FIG. 18 shows the fins of FIG. 17 secured to an integral heater follower plate arranged in a preferred pattern.

FIGS. 17 and 18 show optional fins that may be used with any of the integral heater follower plates of the invention. Specifically, FIG. 17 shows three different fins, the fins 42, 43 and 44. Fin 42 is the longest fin, fine 43 is an intermediate length fin and fin 44 is the shortest fin.

Fins 42, 43 and 44 are shown arranged in a specific pattern on the bottom surface of follower plate 31. As shown in FIG. 18, the bottom surface of follower plate 31 is divided into eight segments by fins 42 with fins 43 and 44 arranged in a definite pattern between two fins 42. Specifically, the pattern is a fin 42, a fin 44, a fin 43, three fins 44, a fin 43, a fin 44 and then a fin 42. Only two complete sets of the fins 42, 43 and 44 are shown in FIG. 18 since the arrangement of fins 43 and 44 between each pair of fins 42 is the same as the two arrangements shown. Fins 42, 43 and 44 are secured to follower plate 31 by any suitable means such as self tapping screws or bolts. If screws or bolts are used, a plurality of holes arranged in the proper patterns are cut into follower plate 31. If bolts instead of self tapping screws are used, these holes must, of course, be threaded. To prevent the cluttering of the drawing, the holes used to secure fins 42, 43 and 44 are not shown in FIG. 18 in the area in which no fins are shown. While fins 42, 43 and 44 are specifically shown as being used with an integral heater follower plate 31, these fins may optionally be used with any of the integral heater follower plates of this invention. Note, that in order to illustrate that holes are cut into the bottom surface of the integral heater follower plates to secure fins 42, 43 and 44 in place, a select number of such holes, the holes 13 and the holes 16 in FIGS. 5 and 7, respectively, are shown in FIGS. 5 and 7. Only a few of holes 13 and 16 are shown in FIGS. 5 and 7.

The fins 42, 43, and 44 are made of any suitable material that is a good conductor of heat, aluminum for example; therefore, when these fins are secured to an integral heater follower plate of this invention and the heater system is energized, the fins will also be heated. These fins thus provide additional heating surfaces and also apply pressure on the hot melt material when an integral heater follower plate with fins attached is put in use. The arrangement of fins 42, 43 and 44 shown in FIG. 18 is not critical; however, the arrangement has proven to be an arrangement that permits a free flow of molten hot melt material between the fins.

While the invention has been described with reference to two specific basic embodiments and variations of the two basic embodiments, it will be obvious to those skilled in the art that various changes and modifications can be made to the integral heater follower plates shown and described without departing from the spirit and scope of the invention as set forth in the claims.

I claim:

1. An integrally fabricated heater follower plate comprising:
   a plate having a top surface, a bottom surface and a peripheral edge surface;
   an aperture cut through said plate;
   wiper means secured around said peripheral edge surface, said wiper means extending slightly beyond said peripheral edge surface of said plate;
   at least one spiral groove cut into said bottom surface of said plate;
   a spiral heater wire embedded into said at least one spiral groove; and
   a plurality of heat conducting fins secured in intimate heat contact to said bottom surface of said plate.

2. An integrally fabricated heater follower plate as defined in claim 1 wherein heat conducting fins are arranged in a radial pattern.

3. An integrally fabricated heater follower plate as defined in claim 2 wherein a plurality of spiral grooves in addition to said at least one spiral groove are cut into said bottom surface of said plate and wherein a separate heater wire is embedded into each one of said plurality of grooves.

4. An integrally fabricated heater follower plate comprising:
   a plate having a top surface, a bottom surface and a peripheral edge surface;
   aperture cut through said plate;
   wiper means secured around and extending beyond said peripheral edge surface;
   a plurality of holes cut into said top surface of said plate, said plurality of holes being spaced across said top surface of said plate; and
   a plurality of cartridge heaters, a different one of said plurality of cartridge heaters being housed in each one of said plurality of holes, and
   a plurality of heat conducting fins secured to said bottom surface of said plate.

5. An integrally fabricated heater follower plate as defined in claim 4 wherein said heat radiating fins are arranged in a radial pattern.

6. An integrally fabricated heater follower plate as defined in claim 5 wherein said plurality of holes are cut into said top surface of said plate toward said bottom surface of said plate but not through said bottom surface.

7. An integrally fabricated heater follower plate as defined in claim 5 wherein said plurality of holes are cut into said top surface of said plate toward and through said bottom surface.

8. An integrally fabricated heater follower plate as defined in claim 5 wherein said plurality of holes cut into said top surface of said plate are shallow holes and said plurality of cartridge heaters are flat cartridge heaters.

* * * * *